United States Patent [19]

Farnum et al.

[11] Patent Number: 4,544,520

[45] Date of Patent: Oct. 1, 1985

[54] LASER TARGET FABRICATION, STRUCTURE AND METHOD FOR ITS FABRICATION

[75] Inventors: Eugene H. Farnum; R. Jay Fries, both of Los Alamos, N. Mex.

[73] Assignee: The United States of America as represented by the United States Department of Energy, Washington, D.C.

[21] Appl. No.: 928,027

[22] Filed: Jul. 25, 1978

[51] Int. Cl.⁴ .................................................. G21B 1/00
[52] U.S. Cl. .................................... 376/152; 376/916; 156/292
[58] Field of Search ............................ 176/1; 376/152

[56] References Cited

U.S. PATENT DOCUMENTS 4,323,420   4/1982   Masnari et al. ..................... 376/152

OTHER PUBLICATIONS

"Statement on the LLL Laser Fusion Program Prepared for the JCAE Hearings on Fusion", 3/11/76, Emmett.
Science, vol. 188, 4/75, pp. 30-34.
Laser Focus, 5/77, p. 6.
Fusion Power Report, 4/80, pp. 1-8.
Nature, vol. 281, 10/79, pp. 414, 415.
Popular Science, 12/76, pp. 66-71, 148, 150.
"Exploding Reactors for Power", Marwick, 1973, pp. 16-20, 22, 26-28, 38.
Legislative History of the Atomic Energy Act of 1954, vol. II, pp. 1759, 2305, 2373, 2374.
Legislative History of the Atomic Energy Act of 1954, vol. III, pp. 2849, 2859.
Physics Today, 3/75, pp. 17, 18.
LA-UR-76-2427, 11/76, Farnum et al., pp. 1-16.

Primary Examiner—Harvey E. Behrend
Attorney, Agent, or Firm—Lee W. Huffman; Paul D. Gaetjens; Judson R. Hightower

[57] ABSTRACT

The disclosure is directed to a laser target structure and its method of fabrication. The target structure comprises a target plate containing an orifice across which a pair of crosshairs are affixed. A microsphere is affixed to the crosshairs and enclosed by at least one hollow shell comprising two hemispheres attached together and to the crosshairs so that the microsphere is juxtapositioned at the center of the shell.

6 Claims, 4 Drawing Figures

LASER TARGET FABRICATION, STRUCTURE AND METHOD FOR ITS FABRICATION

FIELD OF THE INVENTION

The invention relates to laser targets and more particularly laser targets comprising microspheres surrounded by at least one shell.

BACKGROUND OF THE INVENTION

Laser neutron production depends on the use of intense, short pulse width laser radiation to produce thermonuclear reaction or "burn" in an appropriate fuel. The laser radiation causes the fuel to literally implode upon itself, thereby producing a density in temperature at which the burn can effectively occur. Ideally, the most efficient burn should be created by a perfectly spherical symmetric implosion of the fuel. This requires the fuel to be present in a spherical form and to be irradiated simultaneously and uniformly about its entire outer periphery or the outer periphery of its spherical container.

One type of target structure and method of its preparation is taught in U.S. Pat. No. 4,038,125 to Fries et al. The Fries et al. patent teaches a laser target constructed on a thin plastic film on the order of 500 Å in width. Although this type of target structure is highly suitable for use, there are times when plastic is not desirable inside the shell. Furthermore, such a target is not glued together but is fabricated utilizing a thermosetting plastic.

The most common type of laser target structure at present comprises a microballoon and at least one surrounding shell affixed to a single stalk. This structure requires micromanipulation within three dimensions to position and hold the shells while the glue sets. Fabrication of a single target is difficult and time consuming requiring two microscopes for assembly. The diameter of the stalk is on the order of 5 to 10μ.

In fabricating a target on a stalk, a first plastic spherical shell is cut into hemispheres and a 10 μm hole is drilled near the pole of one of the hemispheres. A stalk is selected and its 5 μm tip is ground flat perpendicular to its longitudinal axis. The 5 μm flat tip of the stalk is inserted through the 10 μm hole in the drilled hemisphere and is positioned 50 μm away from and pointed at the center point of the hemisphere. The drilled hemisphere is then glued to the stalk and a microballoon is glued to the tip of the stalk so that it is positioned at what will be the center of the sphere formed when the undrilled hemisphere is glued to the drilled hemisphere to form a sphere about the microballoon. The edges of the undrilled hemisphere are then aligned with the edges of the drilled hemisphere and glued thereto.

The target structure which is the subject of the instant invention is useful in producing neutrons. Several references which illustrate the use of and describe such targets are "More Evidence That Fusion Works" by Harlow G. Ahlstrom and John F. Holzrichter, Laser Focus, Sept. 1975, Vol. 11, No. 9, page 39 et seq., "Laser-Driven Compression of Glass Microspheres," P. M. Campbell et al., Physical Review Letters, Vol. 34, No. 2, Jan. 13, 1975, pages 74–77, "Double-Shell Target Designs for the Los Alamos Scientific Laboratory Eight-Beam Laser System," Joseph M. Kindel and Michael A. Stroscio, LA-7167-MS, March 1978, "Spatially Resolved α Emission from Laser Fusion Targets," N. M. Ceglio and L. W. Coleman, Physical Review Letters, Vol. 39, No. 1, July 4, 1977, "Implosion Experiments With $D_2$, $^3$He Filled Microspheres," V. W. Slivinsky et al., Preprint UCRL-78450 Rev. 1, Mar. 11, 1977, and "Laser-Fusion Ion Temperatures Determined by Neutron Time-Of-Flight Techniques," R. A. Lerche et al., Preprint UCRL-79375, April 1977.

One object of the present invention is to simplify the assembly of laser target structures.

Another object of the present invention is to provide for relatively easy accurate assembly of multi-shell targets.

One advantage of the present invention is that the shells surrounding the microsphere need only be manipulated in two dimensions in order to center the microsphere within the shell during target fabrication.

Another advantage of the instant invention is that the target constructed in accordance therewith is relatively free of undesirable constituents within the shell assembly.

SUMMARY OF THE INVENTION

In accordance with the present invention, there is provided a method of assembling a laser target structure comprising the steps of fixing at least two glass fibers essentially at right angles to one another across an orifice in a plate, gluing to each of the fibers a microsphere essentially at its equator so that it is disposed in one quadrant formed by the crossed fibers and affixed to each, and forming at least one shell about said microsphere in fixed position thereabout by gluing hemispheres of equal size to the crossed fibers to enclose the microsphere essentially at the center of a spherical shell formed by mating the two hemispheres.

BRIEF DESCRIPTION OF THE DRAWINGS

Other objects and advantages of the instant invention will be clear to those skilled in the art from the following description with reference to the appended drawings wherein like numbers denote like parts and wherein.

DETAILED DESCRIPTION OF A PREFERRED EMBODIMENT OF THE INVENTION

Figure 1:
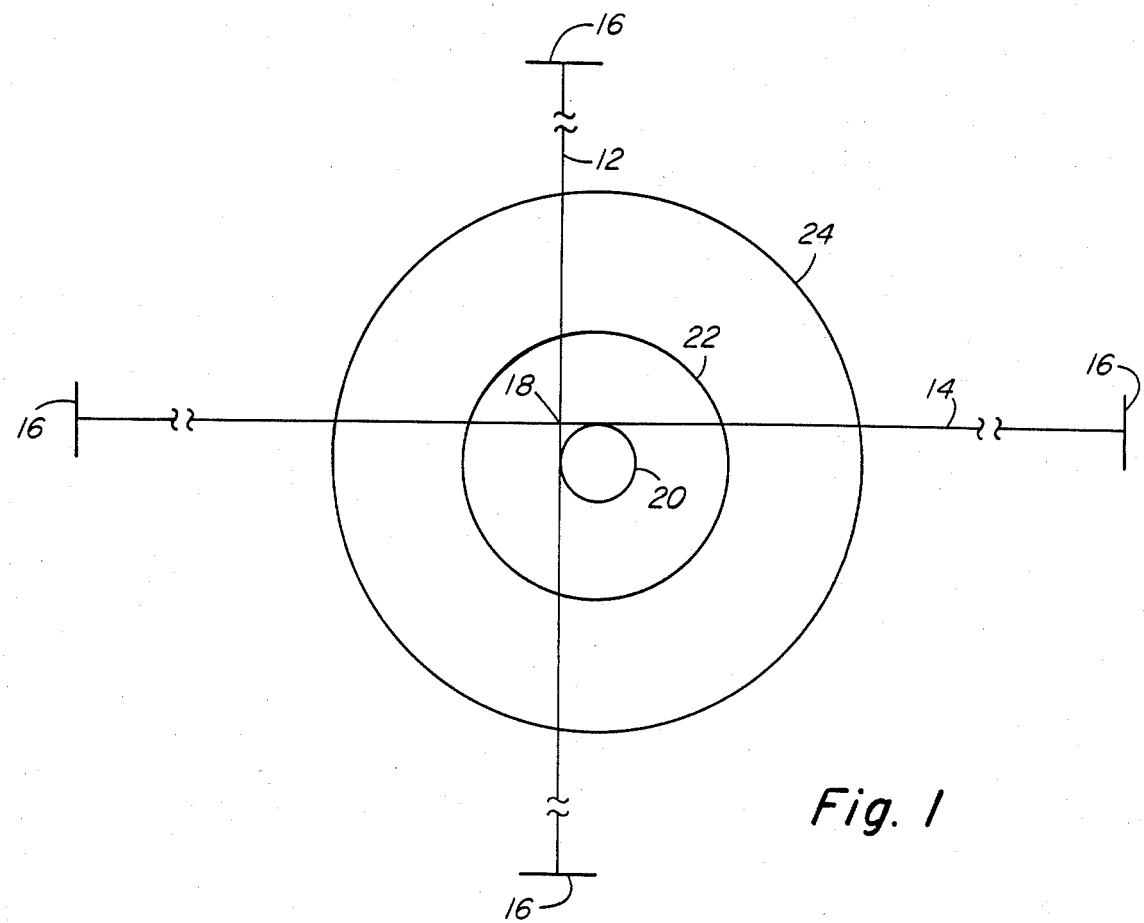
FIG. 1 shows a cross-sectional view of two shells about a microballoon affixed to a pair of crosshairs in accordance with the preferred embodiment of the invention.
Figure 2:
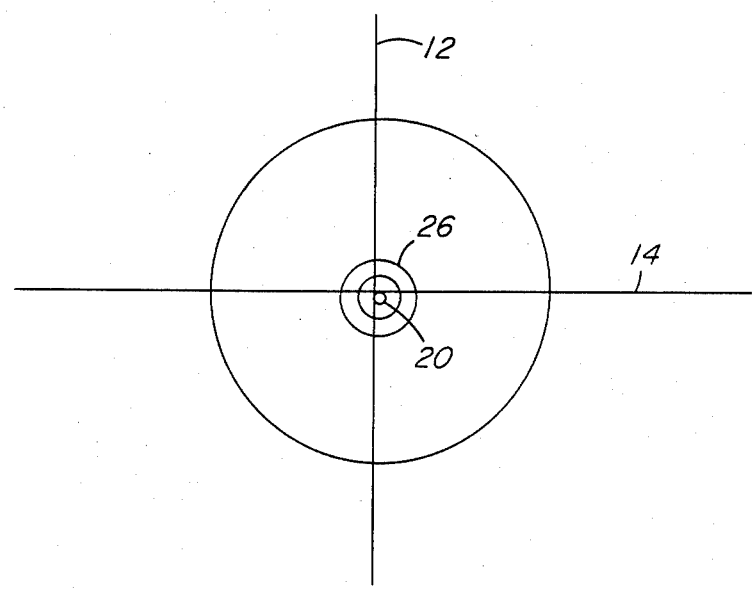
FIG. 2 shows a cross-sectional view of a third sphere surrounding the first two shells and microballoon.
Figure 3:
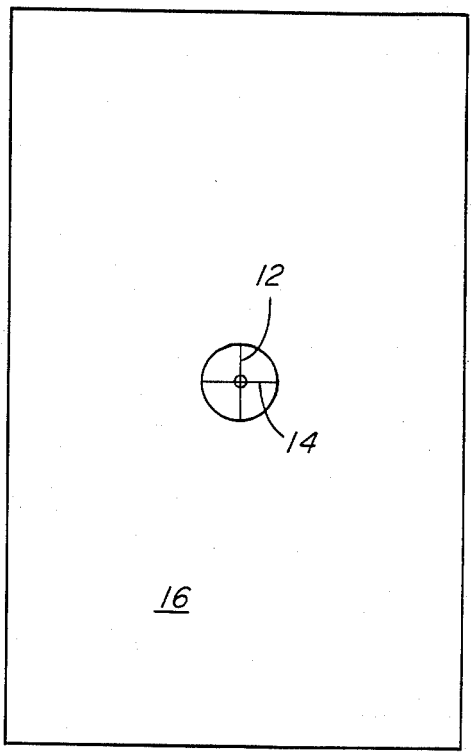
FIG. 3 shows the target of FIG. 2 disposed in a target holder.

Reference is now made to FIGS. 1 and 3 which show a pair of crosshairs 12 and 14 which preferably comprise glass having a diameter from 5 μm to 10 μm but which can be 2 μm or less in diameter affixed to a target plate 16. Crosshairs 12 and 14 cross at point 18. The crosshairs are affixed together to the target holder by means of a glue such as a fast setting epoxy. All manipulation of the crosshairs, microsphere and target shells is readily accomplished with a fast taper, fine tipped probe such as a single bristle brush of beagle hair. Work is done under a microscope positioned to be looking down on the target, i.e., perpendicular to and positioned above or below the target as seen in FIGS. 1, 2 and 3.

Figure 4:
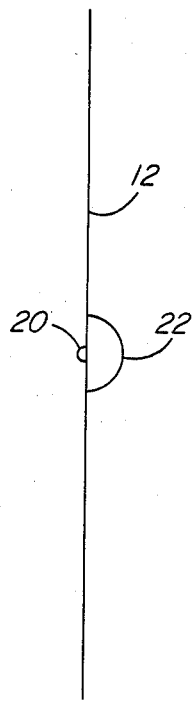
FIG. 4 shows a side view of a partially completed target.

A microballoon 20 is affixed tangentially at an equator or great circle to each of the crosshairs by glue or epoxy such as that which holds the crosshairs to the target plate 16. It will be noted that the microballon 20 is not affixed about crosspoint 18 but rather rests in a quadrant formed by crosshairs 12 and 14. Therefore, each surrounding shell in order to incorporate the microsphere at its center as desired will be slightly displaced from having its center aligned on crosspoint 18. It will be understood by those skilled in the art that this misalignment from the crosspoint will be extremely small because the microballoons are on the order of 100 $\mu$m in diameter. Also, since the microballoon is fixed in the horizontal plane, its vertical position may be accurately adjusted by a temporary 90° rotation of the sample holder under the microscope. After the glue holding microsphere 20 to crosshairs 12 and 14 has been allowed to dry sufficiently, microsphere 20 is not easily displaced from its proper position. A first shell 22 is fabricated utilizing two hemispheres. A first hemisphere, as seen in FIG. 4, is glued to the underside of the crosshairs as seen by the microscope under which the target structure is fabricated, and the second hemisphere is affixed over the first so that they mate to form a sphere which is glued to the crosshairs. A second shell 24 is affixed to crosshairs 12 and 14 as was shell 22. Further, a shell 26, seen in FIG. 2, is similarly affixed on crosshairs 12 and 14 about shells 22 and 24. It will be appreciated by those skilled in the art that any number of shells can be affixed about one another as hemispheres glued to crosshairs 12 and 14 so that microballoon 20 occupies the common center of all such shells and that if the fibers cause an undesirably large separation of the shells at the equator, the shells can be notched to accommodate the fibers.

In practice, spherical shells are cut into hemispheres. Two glass fibers are glued to the target holder to form crosshairs. The equator of a microballon is glued tangentially to each of the crosshairs. One of the hemispheres is glued to the crosshairs concentric to the microballoon. The target holder is turned over and the second hemisphere is aligned with and glued to the first hemisphere to form a spherical shell having the microballoon positioned at its center.

The target provided by the method of this invention provides greater stability for shells and the shells are more consistently and accurately centered about microballoon 20 than is possible with existing methods of target fabrication.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

1. A neutron producing laser target comprising:
    a pair of crossed glass fibers disposed across an orifice on a target supporting plate;
    a microsphere disposed in a quadrant formed by said crossed fibers glued at an equator tangentially to each of said fibers; and
    at least one shell enclosing said microsphere comprising two hemispheres glued to said fibers with said microsphere disposed essentially at the center thereof.

2. The invention of claim 1 wherein said fibers are at most about 5 to about 10 $\mu$m in diameter.

3. The invention of claim 1 wherein said glass fibers are juxtapositioned essentially at right angles to one another.

4. The invention of claim 1 wherein said shell is about 100 $\mu$m in outside diameter.

5. The invention of claim 1 further comprising at least a second shell enclosing said first shell comprising two hemispheres glued to said fibers.

6. The invention of claim 5 wherein said second shell is essentially 500 $\mu$m in outside diameter.

* * * * *